United States Patent [19]

Huang

[11] Patent Number: 5,355,552

[45] Date of Patent: * Oct. 18, 1994

[54] AIR CUSHION GRIP WITH A CUBIC SUPPORTING STRUCTURE AND SHOCK-ABSORBING FUNCTION

[76] Inventor: Ing-Chung Huang, No. 15 Reh-Her 1st Street, Kaohsiung City, Taiwan

[ * ] Notice: The portion of the term of this patent subsequent to Mar. 16, 2010 has been disclaimed.

[21] Appl. No.: 26,686

[22] Filed: Mar. 4, 1993

Related U.S. Application Data

[63] Continuation-in-part of Ser. No. 734,487, Jul. 23, 1991, Pat. No. 5,193,246.

[51] Int. Cl.⁵ .................... A47B 95/02; A47J 45/10
[52] U.S. Cl. ................... 16/111 R; 16/114 R; 16/116 R; 273/75; 273/81 R
[58] Field of Search ............. 16/111 R, 114 R, 116 R; 273/75, 81 R

[56] References Cited

U.S. PATENT DOCUMENTS

| | | | |
|---|---|---|---|
| 4,912,861 | 4/1990 | Huang | 36/29 |
| 5,158,767 | 10/1992 | Cohen et al. | |
| 5,193,246 | 3/1993 | Huang | 16/116 R |

*Primary Examiner*—Carmine Cuda
*Attorney, Agent, or Firm*—Bacon & Thomas

[57] ABSTRACT

An air cushion grip with a cubic structure and shock-absorbing function for fixing around the handle of a tennis racket, a hammer, a bicycle or the like, and comprising an outer flat layer and a bottom layer provided with a plurality of round and/or straight grooves, the vertical walls of which form a plurality of air cells which may be either independent or communicating with one another. The air cells may be inflated or deflated with an air pump which may be permanently attached to one of the air cells for adjusting the elasticity and shock-absorbing ability of the grip.

14 Claims, 15 Drawing Sheets

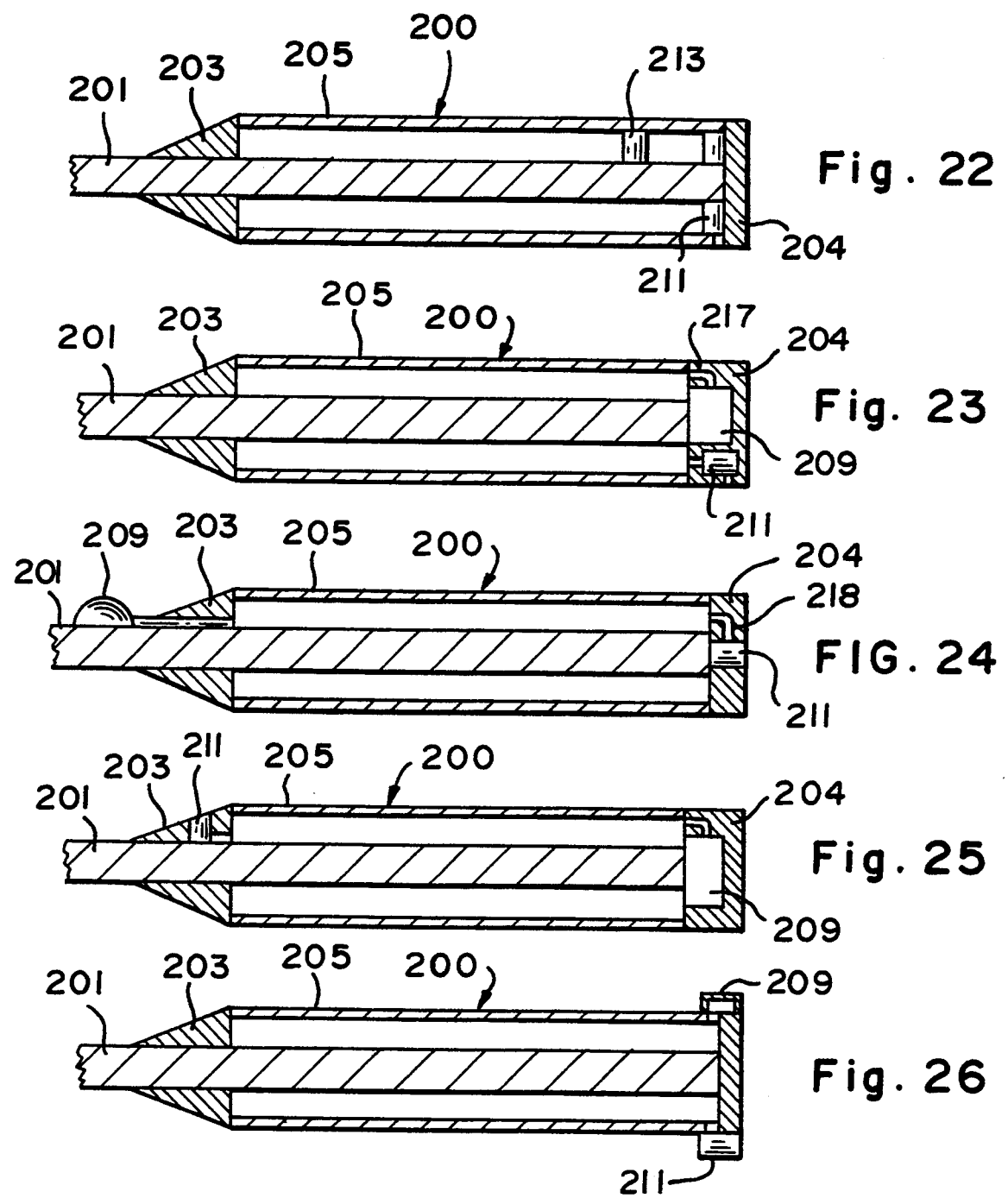

AIR CUSHION GRIP WITH A CUBIC SUPPORTING STRUCTURE AND SHOCK-ABSORBING FUNCTION

CROSS REFERENCE TO RELATED APPLICATION

This application is a continuation-in-part of application Ser. No. 07/734,487 filed on Jul. 23, 1991, and now U.S. Pat. No. 5,193,246.

BACKGROUND OF THE INVENTION

At present grips for tennis rackets, badminton rackets, bicycle handles, motorcycle handles, steering wheels of cars, hammers, jackhammers, etc., can be classified into two kinds. One kind is an elastic solid grip made of rubber or plastic, and the other is a hollow-sectioned grip made of rubber or plastic. The former, the solid grips, have no more than the elasticity of their material for absorbing and are thus without any additional structural benefits. So their elasticity is definite, not adjustable for various practical uses. The latter have the elasticity of the material plus that provided by a plurality of the hollow sections formed therein. So they can save more material and have better elasticity than the former. In spite of that, they still have drawbacks in that the elasticity of the material remains constant and the elasticity provided by the hollow sections is not changeable.

Those kinds of conventional grips cannot satisfy a variety of shock-absorbing functions for different objects or tools in practical use.

SUMMARY OF THE INVENTION

In view of the defects of conventional grips mentioned above, an air cushion grip with a cubic supporting structure and shock-absorbing function in the present invention has been devised to have the following effects and functions.

1. It has an original structural shock-absorbing elasticity of $P1V1 = P2V2$, which represents the relationship between the cubic space and internal pressure, even when not inflated with air. Thus, the cubic space of an air cushion has a given constant pressure, whether or not inflated. When the cushion is depressed, the pressure is increased because of the reduced space. The pressure resumes its original value when the space resumes its original shape. Thus, the cubic or three-dimensional cushion provides elasticity when it is depressed.

2. It can be attached with an inflating means or a compressible pump to adjust the inner pressure to satisfy requirements of different users.

3. It has not only an ideal shock-absorbing elasticity but also a shock dispersive ability that is rarely seen in a conventional grip.

4. It can adapt to needs of different users, while lowering shock injury to a human body.

5. Its elasticity can be readily changed by a user to obtain a proper feel or a proper shock-avoiding effect, which is not possible in a conventional grip with a definite unchangeable elasticity.

6. It provides a grooved surface and a flat surface which maintains shape integrity after it is inflated with air to retain the original configuration and provide a smooth outer surface.

BRIEF DESCRIPTION OF THE DRAWINGS

FIG. 4-1 is a cross-sectional view of line 4-1—4-1 in FIG. 4.

FIG. 4-2 is a cross-sectional view of FIG. 4.

FIG. 4-3 is a cross-sectional view of FIG. 4, with a different fixing method on a grip of a racket from FIG. 4-2.

FIG. 13-1 is a cross-sectional view of line 13-1—13-1 in FIG. 13.

FIG. 14-1 is a cross-sectional view of line 14-1—14-1 in FIG. 14.

FIG. 15-1 is a cross-sectional view of line 15-1—15-1 in FIG. 15.

FIG. 16-1 is a cross-sectional view of line 16-1—16-1 in FIG. 16.

FIG. 19-1 is a cross-sectional view of line 19-1—19-1 in FIG. 19.

FIG. 19-2 is a cross-sectional view of the fourth embodiment of an air cushion grip wound in a round configuration.

FIG. 20-1 is an elevational view of the fifth embodiment of an air cushion grip shown in FIG. 20.

FIG. 21-1 is a cross-sectional view of line 21-1—21-1 in FIG. 21.

FIG. 21-2 is a cross-sectional view of the sixth embodiment of an air cushion grip wound round.

FIGS. 22–26 depict five different embodiments of the invention as wide to a handle having a solid core, such as a tennis racket handle, and shown with associated air pumps and release valves.

DETAILED DESCRIPTION OF THE PREFERRED EMBODIMENTS

Figure 1:
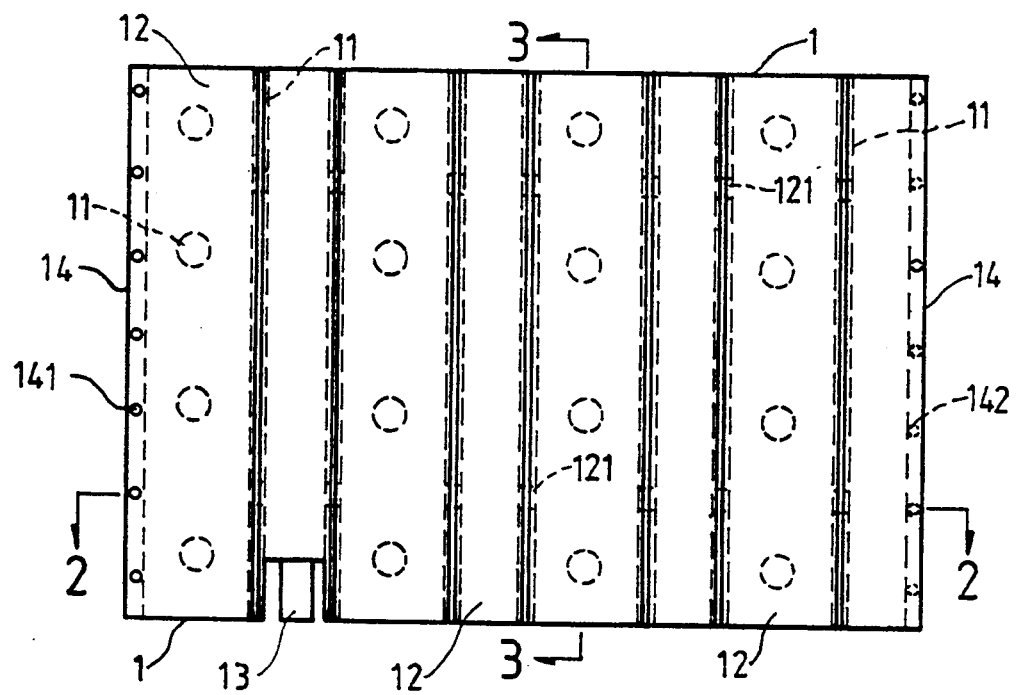
FIG. 1 is an elevational view of the first embodiment of an air cushion grip in the present invention.

The first embodiment of an air cushion grip with a cubic supporting structure and shock-absorbing function in the present invention, as shown in FIG. 1, comprises an air cushion I consisting of an outer layer of flat surface and a bottom layer having a plurality of round and/or straight long grooves 11 to form a three dimensional surface which can be mixed with curved, sloped-up or sloped-down and flat portions.

The vertical walls of straight grooves 11 form a plurality of cubic air cells 12 that are either independent or communicate with one another. When cells 12 do not communicate with one another, they are independent and have a certain inner pressure.

Figures 1, 2, 3, 4:
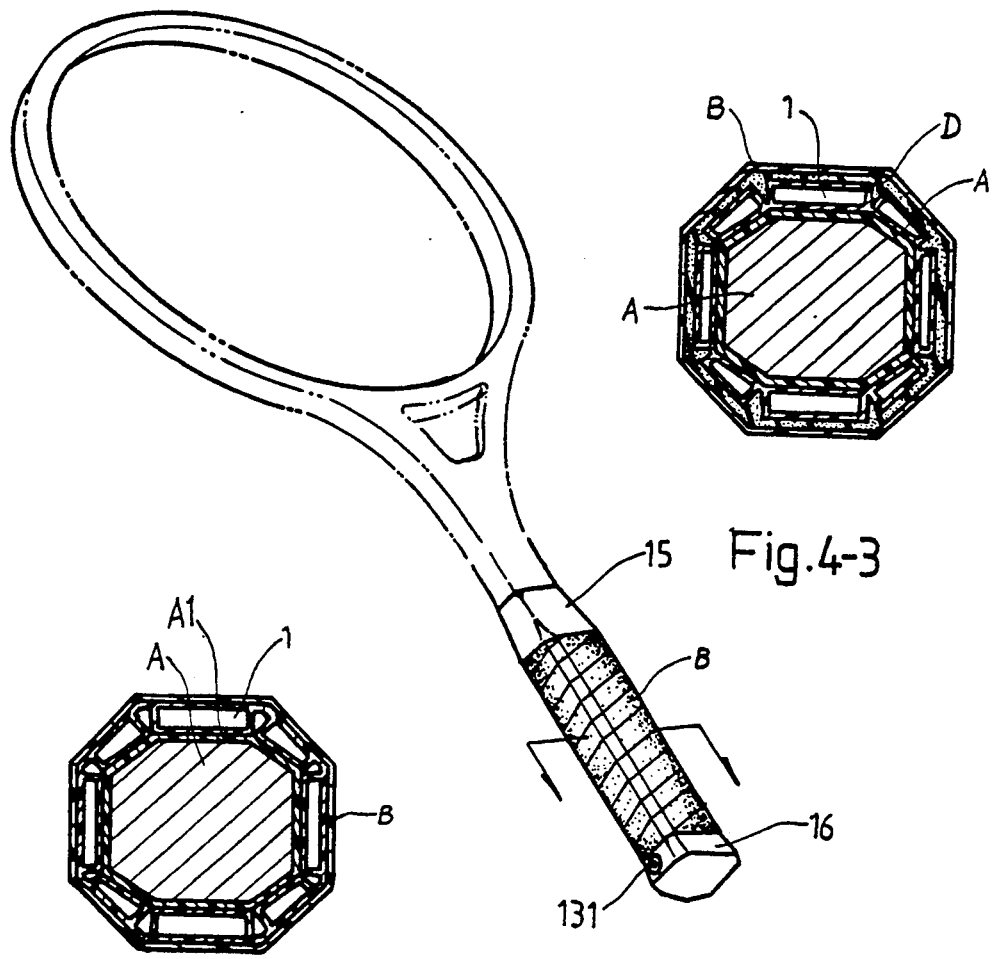
FIG. 4 is perspective view of a tennis racket fixed with the first embodiment of an air cushion grip in the present invention.

When cells 12 are made to communicate with one another, passage tubes 121 of triangle, trapezoid, semi-circular, etc. are placed across the walls of straight grooves 11. A round hollow tube 13 can be attached to any of the communicating air cells 12 and a one-way valve 131, as seen in FIG. 4, can be connected with the outer end of the tube 13. The one-way valve 131 may be a rubber valve or an air valve used in a bicycle tire. Both side edges 14, right and left, are to be glued together, shaping this air cushion grip into a cylindrical configuration to fit around a handle of an object. The surface of the bottom layer and the height of the air cushion cells 12 can be such that the inner wall of the cross-section of the cylindrical grip can be circular, hexagonal, square, octagonal, etc., and the outer wall can be circular, square, hexagonal, octagonal, etc. so that this grip can be applied to handles of rackets or tools of any shape.

Figure 2:
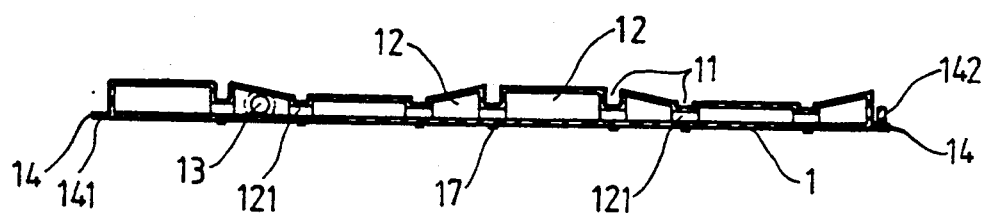
FIG. 2 is a cross-sectional view of line 2—2 in FIG. 1.
Figure 3:
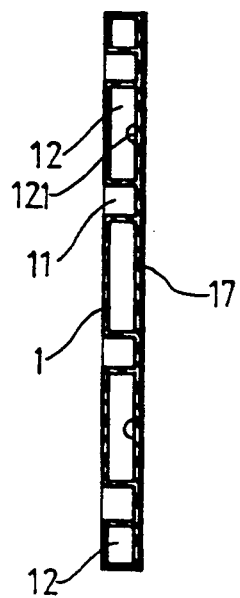
FIG. 3 is a cross-sectional view of line 3—3 in FIG. 1.

When the first embodiment of an air cushion grip in the present invention has been applied around a grip of a tennis racket, positioned between a flake 15 and a heel 16 as shown in FIGS. 4, 4-1, 4-2, 4-3, an outer enveloping layer B can be bound on the air cushion grip, and the one-way valve 131 is positioned to extend to the flake 15 or the heel 16 for inflating the air cushion grip, as show in FIG. 4-1. Or, as shown in FIG. 4-2, a layer of double-side glued tape A1 is first wound around the grip of a racket, and then the air cushion grip and the outer enveloping layer B are thereafter bound on thereto. Alternatively, as shown in FIG. 4-3, a PU or polyurethane foam layer D is first bound on the air cushion grip and the outer enveloping layer B is then bound on the foam layer D.

Figure 5:
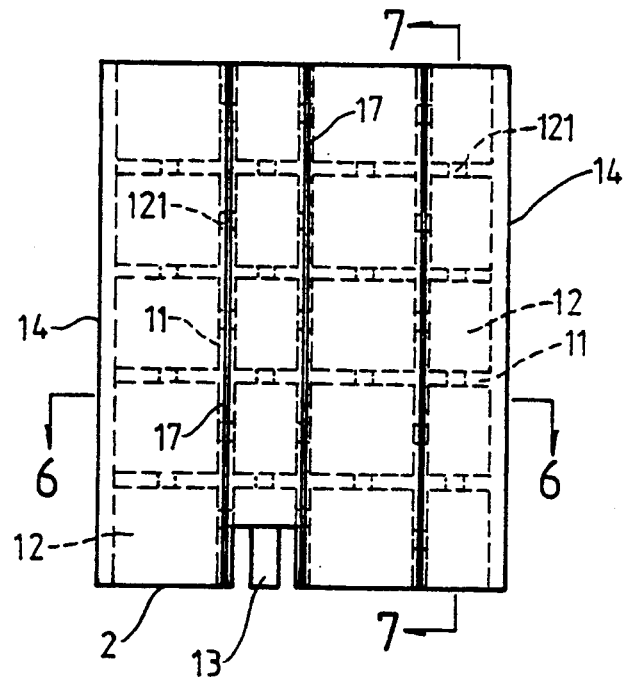
FIG. 5 is an elevational view of the second embodiment of an air cushion grip in the present invention.
Figure 6:
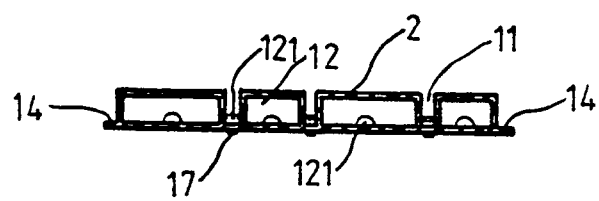
FIG. 6 is a cross-sectional view of line 6—6 in FIG. 5.
Figure 7:
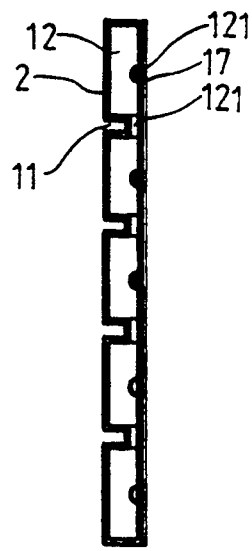
FIG. 7 is a cross-sectional view of line 7—7 in FIG. 5.
Figure 8:
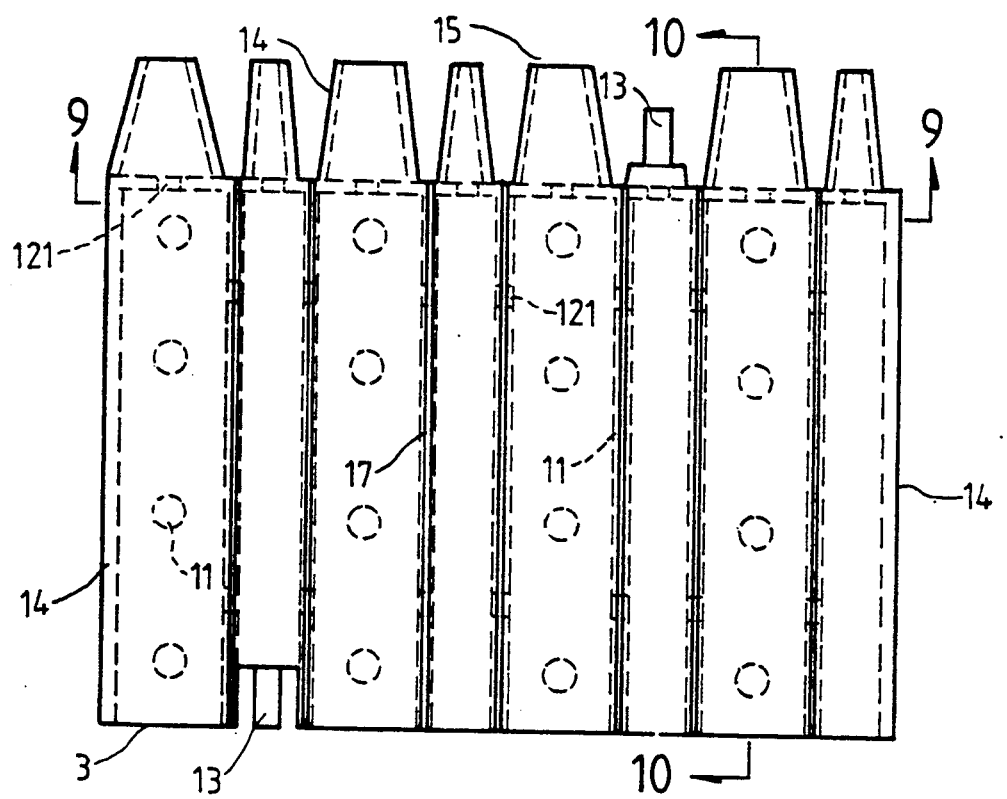
FIG. 8 is an elevational view of the third embodiment of an air cushion grip in the present invention.
Figure 9:
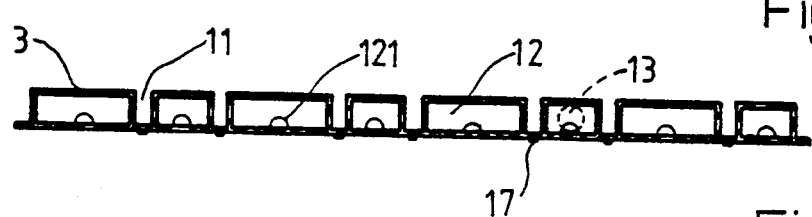
FIG. 9 is a cross-sectional view of line 9—9 in FIG. 8.
Figure 10:
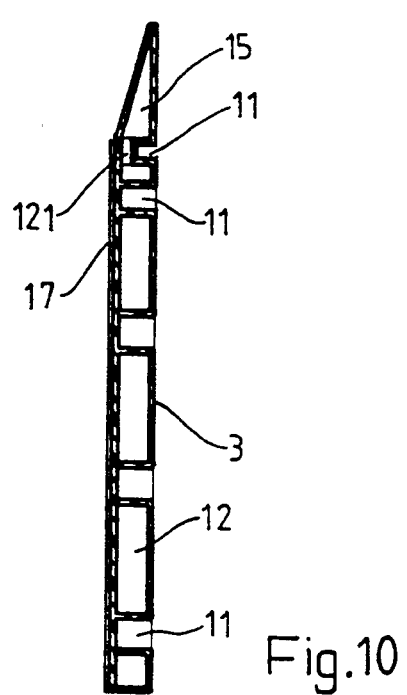
FIG. 10 is a cross-sectional view of line 10—10 in FIG. 8.
Figure 11:
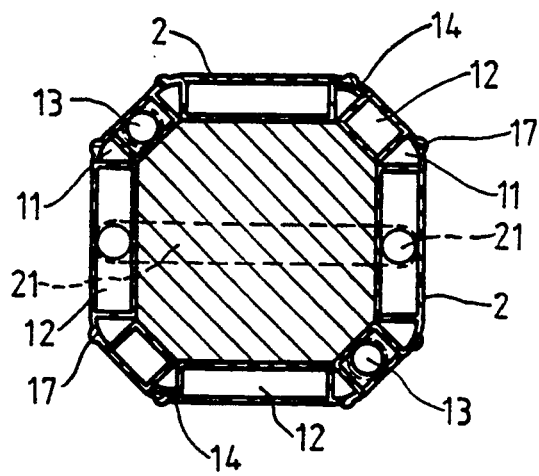
FIG. 11 is a cross-sectional view of the second embodiment of an air cushion grip applied to a grip of an object.
Figure 12:
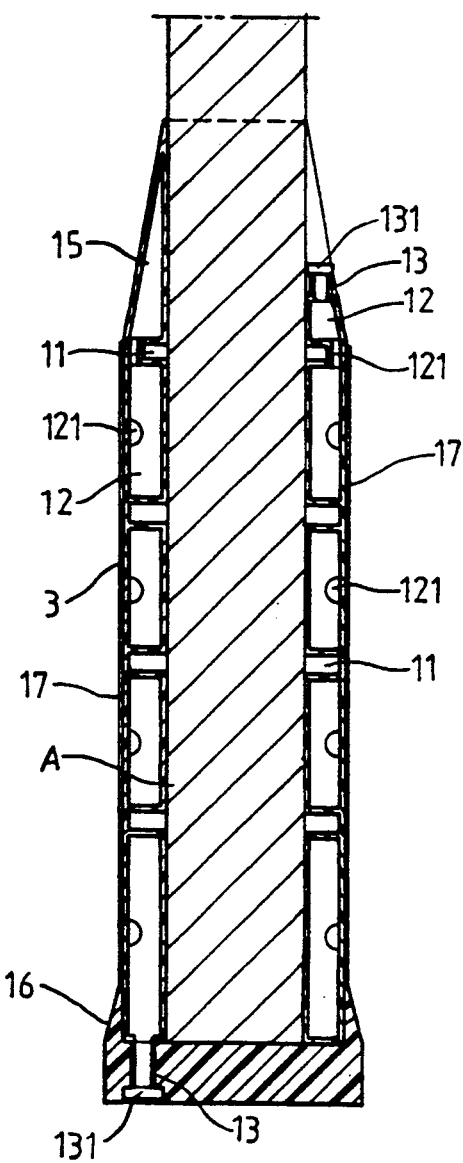
FIG. 12 is a cross-sectional view of the third embodiment of an air cushion grip applied to a grip of an object.
Figure 13:
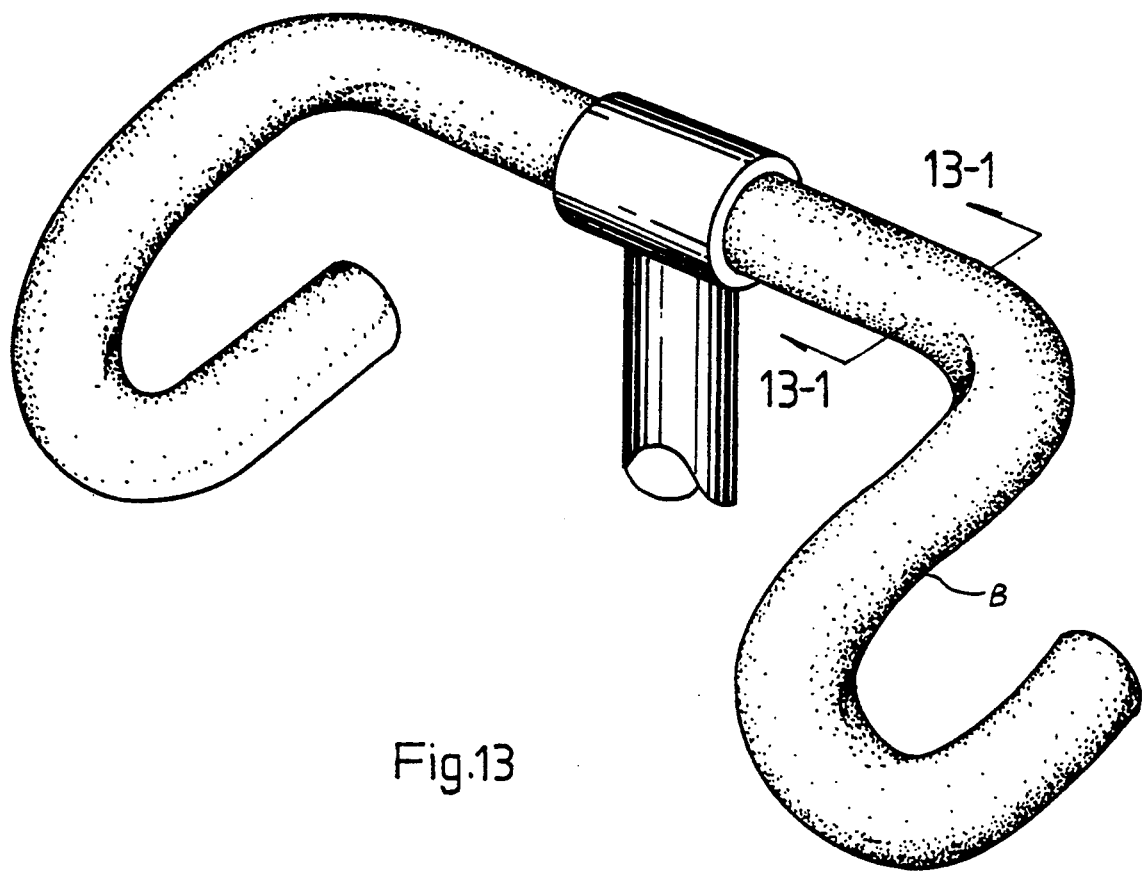
FIG. 13 is a perspective view of an air cushion grip in the present invention practically applied to a bicycle handle.
Figures 1, 13:
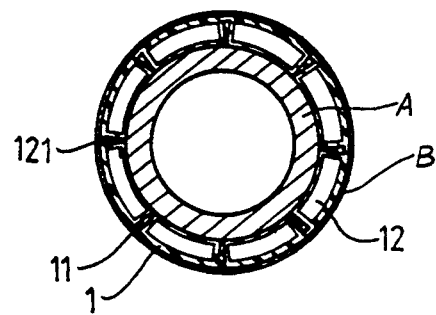
Figure 14:
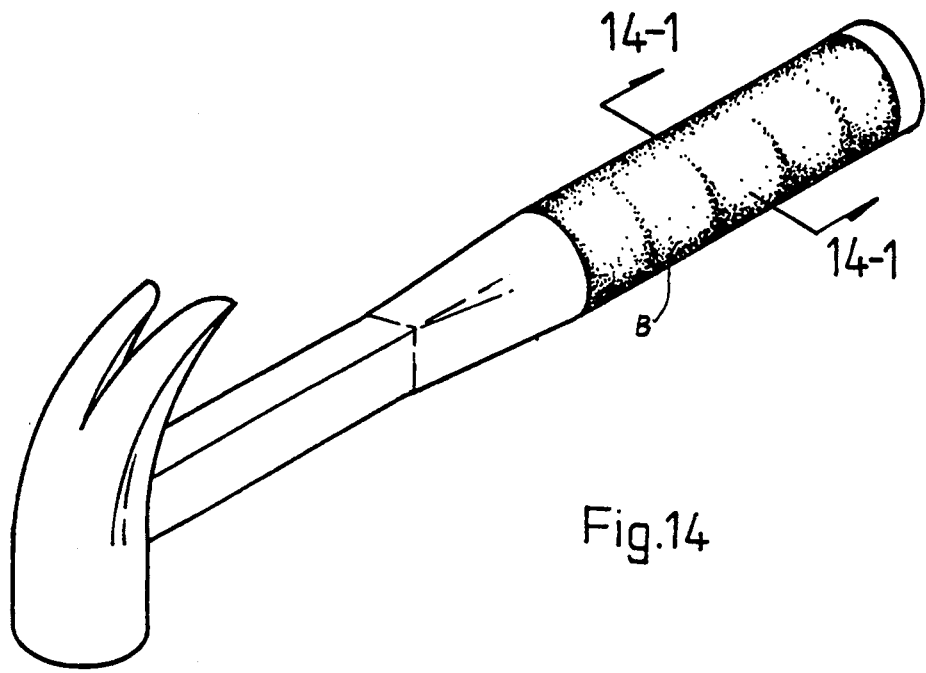
FIG. 14 is a perspective view of an air cushion grip in the present invention practically applied to a hammer.
Figures 1, 14:
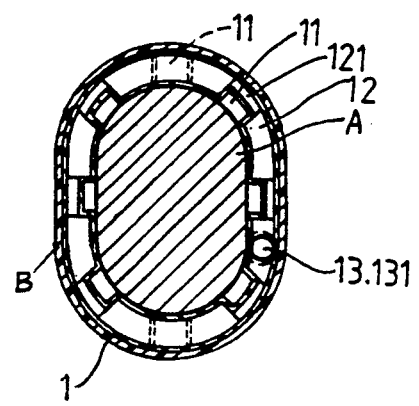
Figure 15:
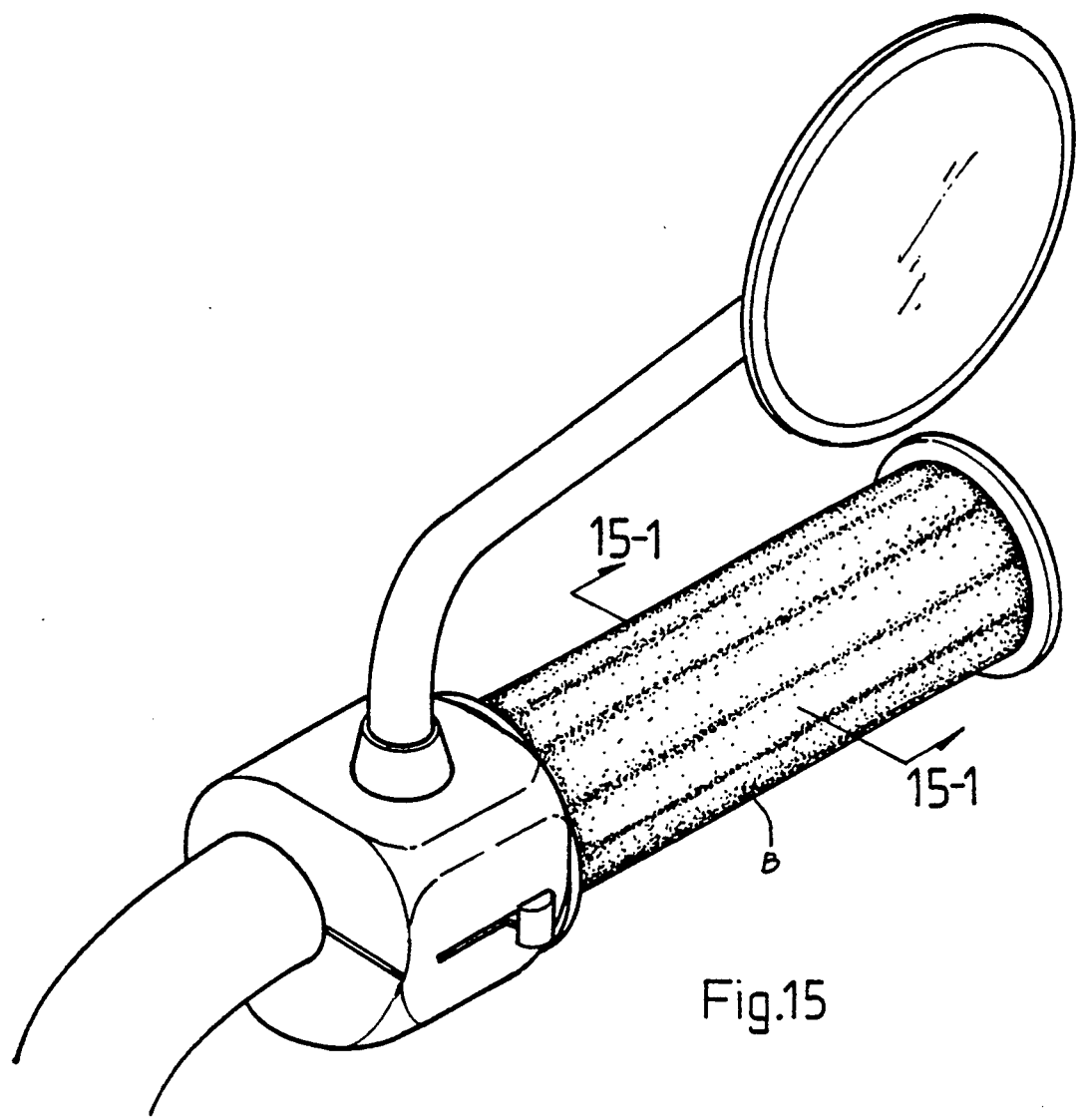
FIG. 15 is a perspective view of an air cushion grip in the present invention practically applied to a motorcycle handle.
Figures 1, 15:
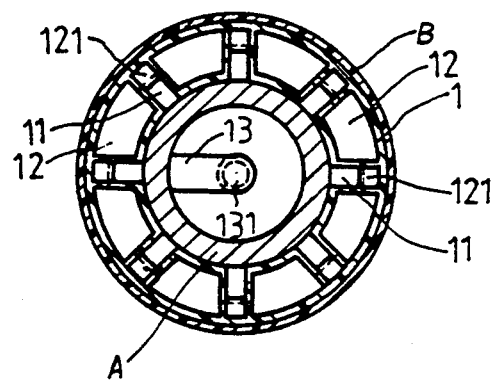
Figure 16:
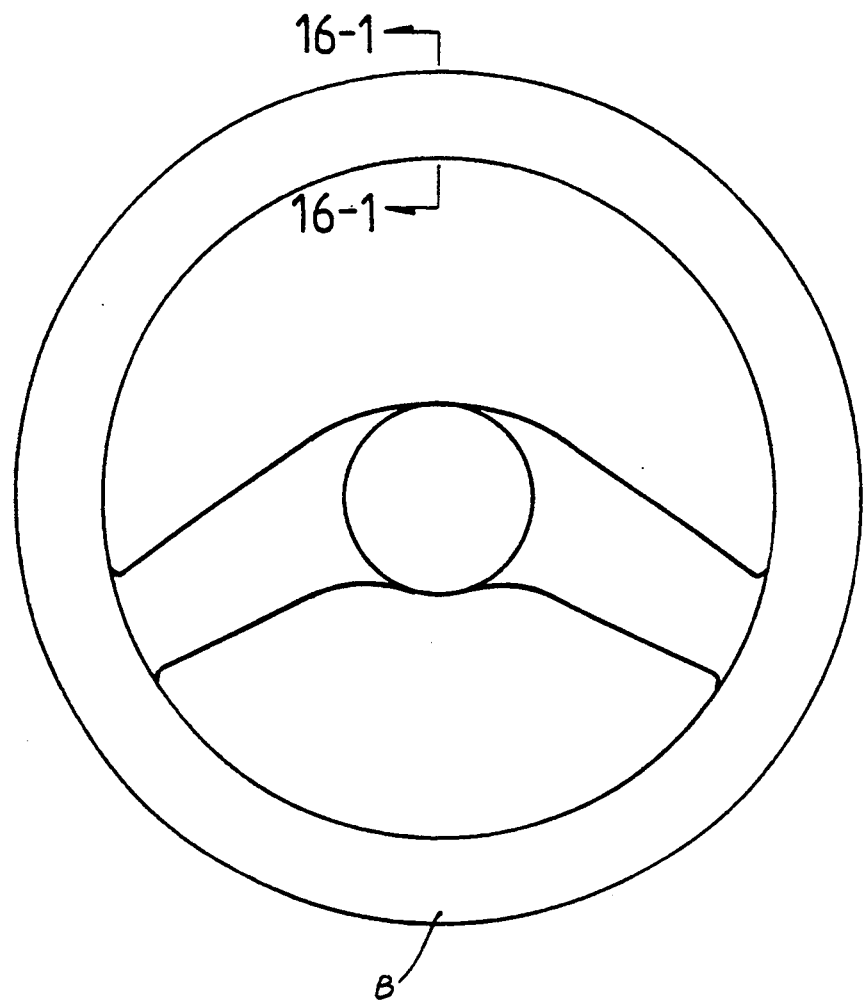
FIG. 16 is a perspective view of an air cushion grip in the present invention practically applied to a steering wheel of a car.
Figures 1, 16:
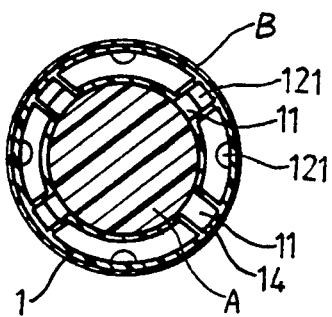

The second embodiment of an air cushion grip is shown in FIG. 5, having an air cushion consisting of a plurality of partial air cushions 2, which comprises an outer flat layer and a bottom layer having a plurality of round grooves and/or straight long grooves 11 joining the bottom layer with the outer layer. The vertical walls of the straight grooves 11 form a plurality of air cells 12 that are either independent or communicate with one another. The partial air cushions 2 can be made to communicate with one another by means of passage tubes 121 so that the air cells 12 communicating with one another may become a group of air cells communicating with one another. A hollow tube 13 can be provided to extend out of an air cell 12 for connecting to a one-way valve to inflate said partial air cushion 2. If the partial air cushions 2 are independent, each cushion 2 can be provided with an inflating means.

The third embodiment of an air cushion grip is shown in FIGS. 8–12, having an air cushion 3 and a front flake 15 and/or heel 16 connected and communicating with the air cushion 3, which is the same as cushions 1, 2 in the first and second embodiments.

FIGS. 13–16 show the air cushion grips in the present invention in practical use and applied to a bicycle handle, a hammer a motorcycle handle and a steering wheel of a car. They have wide applications and are not limited to one object only.

The method of connecting the right edge with the left edge of the air cushion 1, 2 or 3 in forming it into a cylindrical grip can be accomplished by gluing or by button holes 141 and buttons 142 fitting in the button holes 141 and then fused together with heat.

Air cushions for grips according to the invention may also have an outer flat layer and a bottom layer that is not flat but having a plurality of grooves and air cells that are either independent or communicate with one another and of different heights so that they can conform to any shape handle of a racket, a tool, etc.

If an air cushion is needed to be applied on a multigonal object, more than a square, with corner lines, protruding lines 17 are formed on the outer surface of the outer layer at positions corresponding to the corner lines of the object. Then the corner lines will be very sharp after the air cushion grip is fixed around the object. The protruding lines 17 can be square, triangular, semi-circular, etc.

Figure 18:
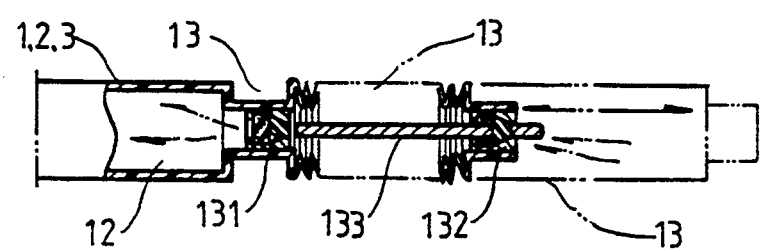
FIG. 18 is a cross-sectional view of another compressible air pump to be connected with an air cushion grip in the present invention.

An air cushion grip in the present invention can be made as a completely sealed air cushion grip without any inflating valves, and having a certain definite interior pressure. It can also be attached with a manual compressible pump as shown in FIG. 18, which consists of a bellows-like flexible hollow tube 13 connected with a plurality of communicating air cells 12, a one-way outlet valve 131 between the air cell 12 and the inner end of said tube 13 and a one-way inlet valve 132 at the outer end of the tube 13. Then the tube 13 can be compressed or released to inflate air into the air cushion through the valves 131, 132. In addition, a pressure releasing rod 133 can be added to extend inward through the inlet valve 132 to open the outlet valve 131 and deflate the air from the air cushion.

Figure 17:
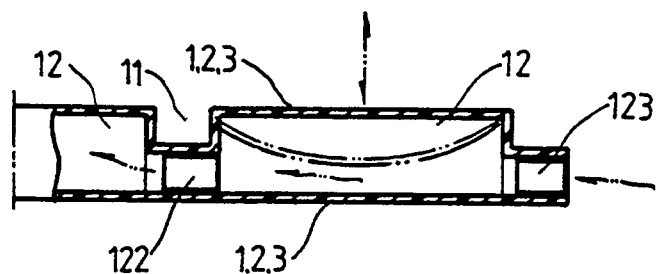
FIG. 17 is a cross-sectional view of a compressible air pump to be connected with an air cushion grip in the present invention.

FIG. 17 shows an outlet valve 122 attached between an outermost air cell 12 and an inner air cell 12 communicating with other air cells 12. An inlet valve 123 can be attached to the outermost air cell 12 and compressed repeatedly to suck the outside air into the inlet valve 123 and through the outlet valve 122 and into the air cushion.

A hollow tube 13 leading to the outside air can be attached to an outermost air cell 12 communicating with air cells 12 in an air cushion grip, as shown in FIGS. 13–16 applied to a racket, a tool, a handle of a bicycle or a motorcycle, or steering wheel of a car. Then a pressure adjusting or releasing valve can be connected with the tube 13.

Figure 19:
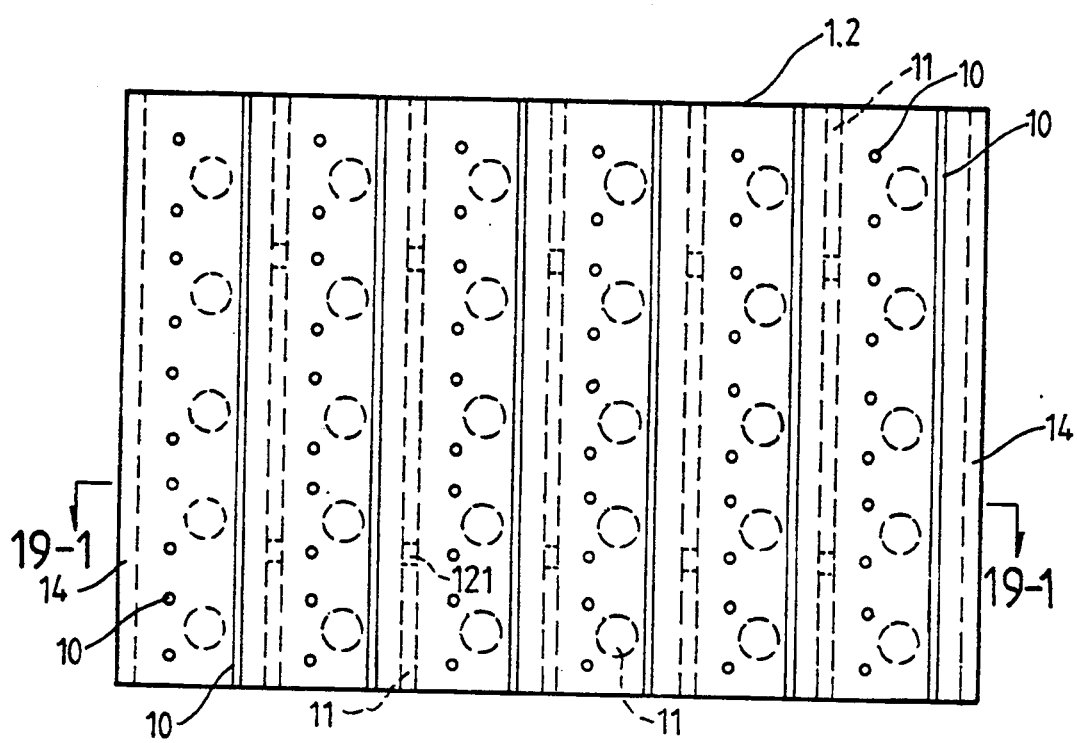
FIG. 19 is an elevational view of the fourth embodiment of an air cushion grip in the present invention.
Figures 1, 19:
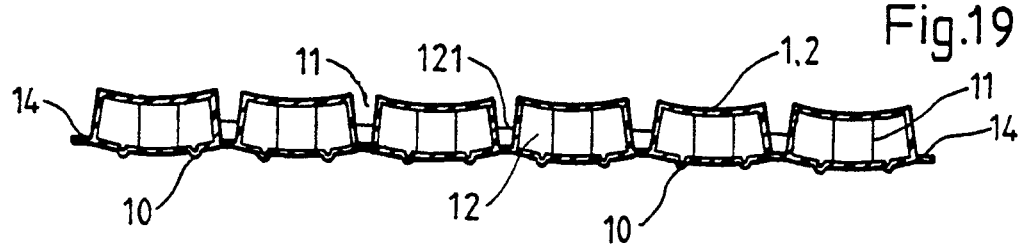
Figures 2, 19:
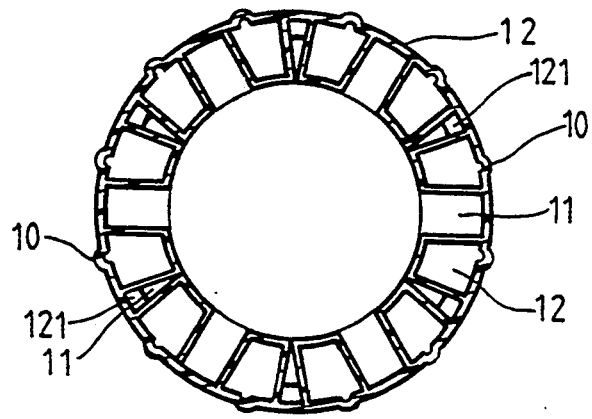

FIGS. 19, 19-1, 19-2 show an air cushion grip having an outer flat layer provided with a plurality of projecting points or lines 10 which provide grip friction, thus preventing a hand holding the grip from sliding off.

Figure 21:
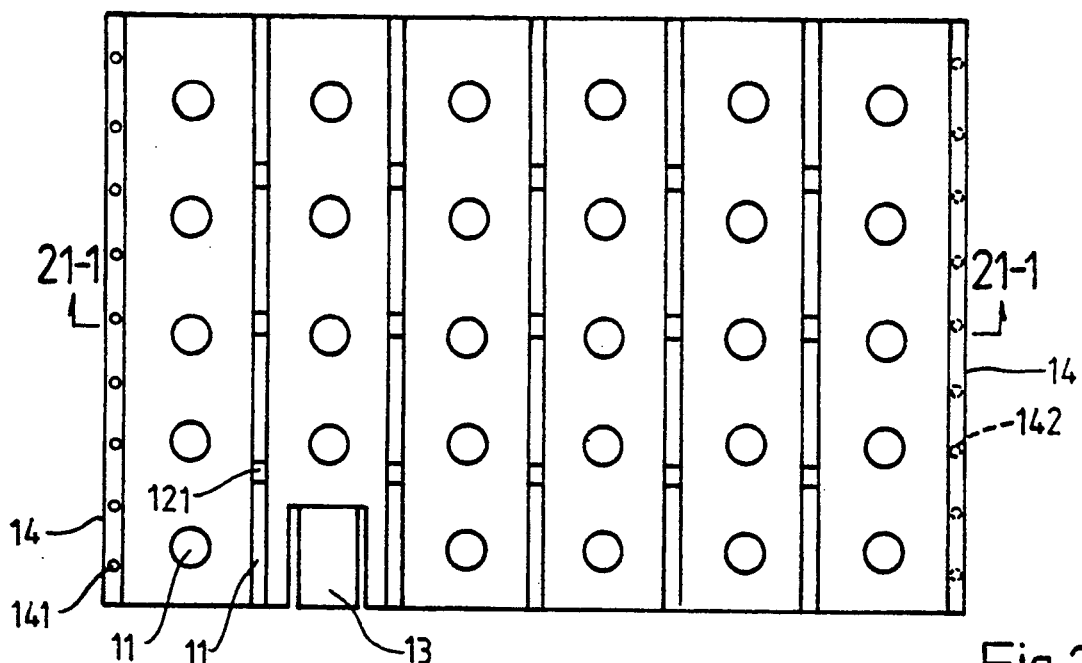
FIG. 21 is an elevational view of the sixth embodiment of an air cushion grip in the present invention.
Figures 1, 21:
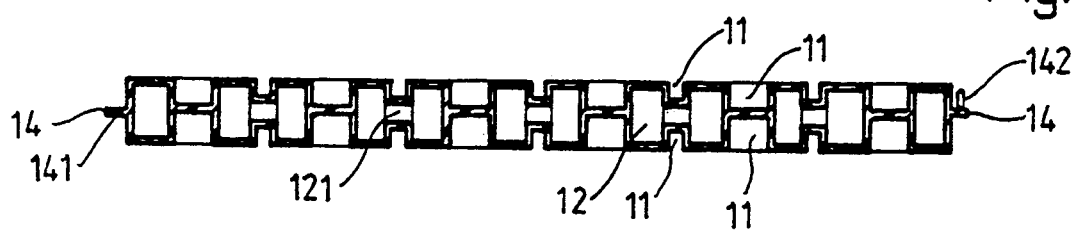
Figures 2, 21:
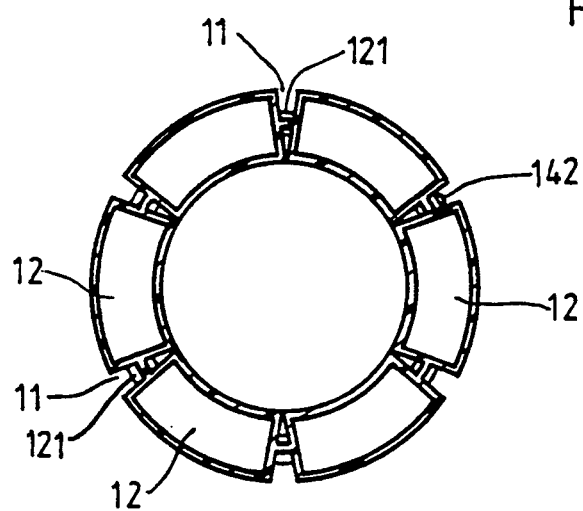

FIGS. 21, 21-1, 21-2 show an air cushion grip having an outer layer provided with a plurality of round and/or straight grooves 11, just like the bottom layer, so that each straight groove 11 in the outer layer has the bottom fused with each straight groove 11 in the bottom layer. This structure can provide grip friction and prevent a hand from sliding off by air circulation through the grooves 11.

As is apparent from the foregoing descriptions, the cushion grip of the invention includes cubic air cells defined by intersecting planes forming desired cross-sectional configurations which permit the air cushion to be wrapped around a handle of a given configuration so that the inner surfaces of the cells engage and conform to the configuration of the handle. This produces a uniform and overlapping engagement between the inner surfaces of the air cells and the corresponding surfaces of the handle so that the outer surfaces of the cushion form a grip having the exact configuration as that of the original handle. This is well exemplified in FIGS. 4-1 through 4-3, FIGS. 13 and 13-1, FIGS. 14 and 14-1, FIGS. 15 and 15-1, and FIGS. 16 and 16-1.

The air cushion handle may be fixed on a grip of an object as follows.

1. It is placed around a handle of an object, for example, a racket, properly positioned between a flake and a heel, and then an outer enveloping layer B is bound thereon as shown in FIG. 4.

Figures 1, 20:
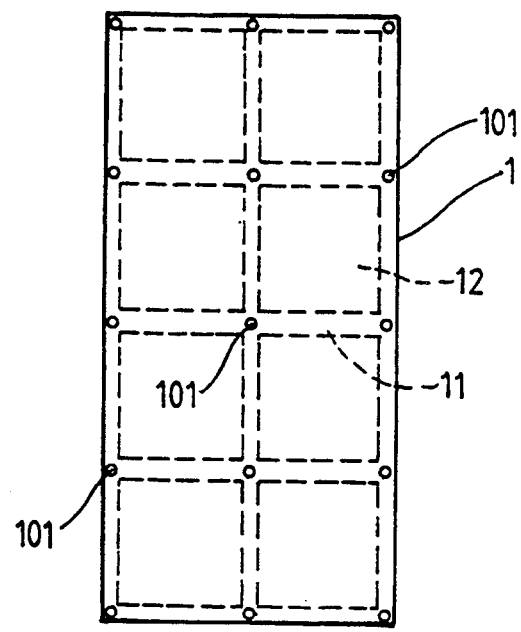
FIG. 20 is a cross-sectional view of the fifth embodiment of an air cushion handle applied on a grip of an object.
Figure 20:
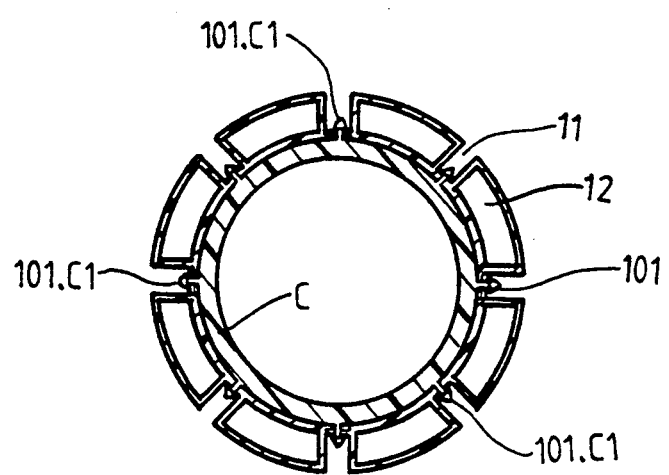

2. A handle of a tool shown in FIG. 20 is first fixed with a base sheet C provided with a number of fastening buttons Cl, and then an air cushion grip is placed in a shallow recess in the base sheet C, being adjusted to position button holes 101 provided in the round or straight grooves 11 in alignment for insertion by the fastening buttons Cl, and thus the air cushion grip is held firmly on the handle of the tool. Then the air cushion grip is kept exposed, making it convenient for replacing an old one by a new one if the air cushion grip should be damaged. The base sheet C may also be made from elastic material having a shock-absorbing effect, without fastening buttons Cl but with a recessed cavity for receiving the air cushion grip.

The outer enveloping layer B can be either a narrow slip of leather, cloth, foam etc, wound partially or wholly cover the air cushion grip, or a foam directly enveloped around the air cushion grip. The air cushion grip can also be applied inside out, with the original outer flat layer serving as the bottom layer and the original bottom layer as the outer layer to expose the grooves.

With reference to FIGS. 22–26, there are shown five different embodiments of an air cushion grip 200 in association with a handle structure of the type including a solid core 201, such as a tennis racket handle or the like. In these embodiments, the handle structure further includes a flake portion 203 and a heel portion 204, such as conventionally associated with a sport racket handle. Both flake and heel portions 203, 204 may be formed of any appropriate material and structure, for example, a resilient and compressible material such as rubber or plastic. However, it is to be understood that these embodiments of the invention can also be advantageously utilized with other handle structures having central cores, such as those associated with hammers, vehicle steering wheels, crutches, handle bars, various tool handles and the like. The common aspect of the embodiment shown in FIGS. 22–26 resides in the inclusion of an air pump that is permanently or substantially permanently secured to cushion grip 200 for inflating same as desired by the user without requiring the attachment and detachment of a separate air pump. This aspect of the invention affords a unique advantage to the user since it is now possible for the user to vary the degree of cushioning effect for cushion grip 200 during use of the racket or other implement with which cushion grip 200 is associated.

As further shown in FIGS. 22–26, cushion grip 200 includes an outer layer 205 formed of appropriate cushion material, such as cloth, plastic or leather, and an internal air bladder 207 incorporating the cubic supporting structure previously shown and described herein. Cushion grip 200 is also provided with an air pump 209, the latter being preferably substantially permanently secured to air bladder 207 of cushion grip 200, and an air release valve 211.

As seen in FIG. 22, air pump 209 may be of a flexible type which is activated by compressing the corresponding portion of outer layer 205 enclosing pump 209. Pump 209 is connected in fluid communication to a cell of air bladder 207 through an appropriate one-way inlet valve that is in turn connected to bladder 207 by a channel for providing fluid communication between the one-way inlet valve and bladder 207. Air bladder 207 is also provided with an appropriate one-way valve member 213 so that activation of pump 209 serves to inflate air bladder 207. Release valve 211 is preferably manually actuated and permits the deflation of air bladder 207 through a vent hole 215. Air pump 209, one-way valve member 213 and release valve 215 are all situated adjacent heel 204 in this embodiment.

The embodiment in FIG. 23 disposes air pump 209 and release valve 211 within heel 204. Activation of pump 209 directs air into air bladder 207 through a connecting passage 217 formed in heel 204. Likewise, deflation of bladder 207 is realized through activation of release valve 211 and the venting of air therethrough.

In the embodiment shown in FIG. 24, air pump 209 is positioned adjacent flake portion 203 for pumping air into bladder 207 through an inlet passage 219. Release valve 211 is positioned at heel 204 and is in fluid communication with bladder 207 through a connecting channel 218.

As seen in FIG. 25, release valve 211 is positioned in flake portion 203, while air pump 209 is disposed within heel portion 204. This arrangement is essentially the reverse of the embodiment shown in FIG. 24.

The embodiment shown in FIG. 26 positions air pump 209 and release valve 211 at the exterior of heel portion 204.

Figure 27:
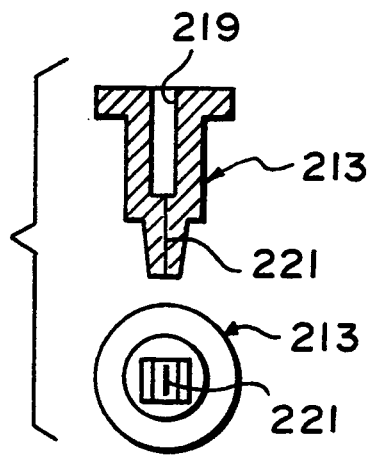
FIG. 27 depicts an embodiment of a flexible one-way air valve which may be used with the invention.

A preferred structure of one-way air valve member 213 is shown in FIG. 27. Valve member 213 is formed from resilient material, such as rubber or plastic, and includes an air inlet passage 219 and an air outlet passage 221, the latter being defined by a slit which opens in response to compressed air through inlet passage 219. Valve member 213 may be utilized within bladder 207 either adjacent air pump 209 or at any other desired location for admitting and maintaining air pressure within bladder 207.

Figure 28:
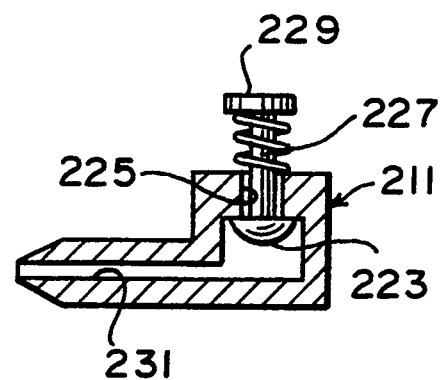
FIG. 28 discloses a spring-biased release valve which may be used with the invention.

A preferred structure of air release valve 211 is depicted in FIG. 28. Release valve 211 includes a valve member 223 which normally seats against and closes an inlet passage 225 under the bias of a coil spring 227 when valve member 223 is urged inwardly by pressing an actuator 229, air is permitted to pass through inlet passage 225 and vent through an outlet passage 231 to the atmosphere. The structural configuration of release valve 211 may of course be modified depending upon its location of use in the practice of the invention and as also exemplified in the different embodiments depicted in FIGS. 22–26.

Figure 29:
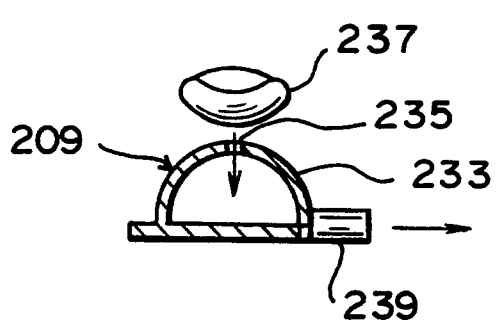
FIG. 29 discloses a flexible air pump operable through compression by the thumb of a user and which may be used with the invention.
Figure 30:
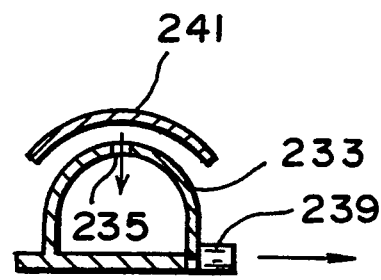
FIG. 30 discloses a flexible air pump similar to that shown in FIG. 29 and provided with a correspondingly configured cover member.

FIGS. 29 and 30 depict a preferred structure of air pump 209 which may be used in the practice of the invention. As seen in FIG. 29, air pump 209 comprises a dome-shaped pump body 233 formed of resilient material, such as rubber or plastic. An air inlet hole 235 is formed at the top of body 233. When the latter is compressed by a thumb 237 of a user, air entering body 233 through hole 235 is compressed and forced out an outlet 239 that includes an appropriate one-way valve member, such as member 213 of FIG. 27. The embodiment in FIG. 30 includes a cover member 241 disposed over body 233, thus requiring the user to press against cover 241 in order to compress body 233. Cover 241 may form a part of flake portion 203, heel portion 204 or outer layer 205 of the embodiments shown in FIGS. 22–26. A one-way valve member is also provided in outlet 239 of this embodiment. It is also apparent from FIGS. 29 and 30 that inlet hole 235 of body 233 automatically functions as a one-way valve since either thumb 237 or cover 241 effectively seals opening 235 and prevents air from escaping during compression of body 233.

I claim:

1. A handle cushion grip of the type wherein the handle includes a central core body surrounded at least in part by an inflatable air bladder enclosed within an outer layer of cushion material, the improvement comprising: an air pump substantially permanently secured to the air bladder for inflating same.

2. The handle cushion grip of claim 1 further including an air release valve substantially permanently secured to the air bladder for releasing air therefrom.

3. The handle cushion grip of claim 2 further including a channel connecting the air bladder with the release valve for providing fluid communication therebetween.

4. The handle cushion grip of claim 2 wherein the release valve includes an inlet passage terminating in a valve seat, a spring biased valve member engaging the valve seat and maintaining the inlet passage in a normally closed position, and an outlet passage venting to the atmosphere.

5. The handle cushion grip of claim 2 further of the type including a flake portion and a heel portion, and wherein the air pump and release valve are substantially entirely enclosed by the outer layer of cushion material and positioned adjacent the heel portion.

6. The handle cushion grip of claim 2 further of the type including a flake portion and a heel portion, and wherein the air pump and release valve are substantially fully enclosed within the heel portion.

7. The handle cushion grip of claim 2 further of the type including a flake portion and a heel portion, and wherein the air pump is disposed at the flake portion and the release valve is disposed within the heel portion.

8. The handle cushion grip of claim 2 further of the type including a flake portion and a heel portion, and wherein the air pump is disposed within the heel portion and the release valve is disposed within the flake portion.

9. The handle cushion grip of claim 2 further of the type including a flake portion and a heel portion, and wherein the air pump and release valve are disposed adjacent to and exteriorly of the heel portion.

10. The handle cushion grip of claim 1 further including a one-way air inlet valve in fluid communication with the air pump for directing and maintaining compressed air into the air bladder.

11. The handle cushion grip of claim 10 further including a channel connecting the air bladder with the one-way air inlet valve for providing fluid communication therebetween.

12. The handle cushion grip of claim 1 wherein the air pump includes a resilient compressible pump body provided with an inlet hole therethrough, an outlet and a one-way valve member at the outlet.

13. The handle cushion grip of claim 1 further of the type including a flake portion and a heel portion and wherein at least one of the portions being formed of a resilient and compressible material.

14. The handle cushion grip of claim 13 wherein both the flake and heel portions are formed of a resilient and compressible material.

* * * * *